(12) United States Patent
Bashyam et al.

(10) Patent No.: US 9,448,948 B2
(45) Date of Patent: Sep. 20, 2016

(54) EFFICIENT REPLICA CLEANUP DURING RESYNCHRONIZATION

(71) Applicant: Dell Products L.P., Round Rock, TX (US)

(72) Inventors: Murali Bashyam, Fremont, CA (US); Sreekanth Garigala, Sunnyvale, CA (US)

(73) Assignee: Dell Products L.P., Round Rock, TX (US)

( * ) Notice: Subject to any disclaimer, the term of this patent is extended or adjusted under 35 U.S.C. 154(b) by 249 days.

(21) Appl. No.: 13/748,743

(22) Filed: Jan. 24, 2013

(65) Prior Publication Data

US 2014/0195748 A1    Jul. 10, 2014

Related U.S. Application Data

(60) Provisional application No. 61/751,245, filed on Jan. 10, 2013.

(51) Int. Cl.
*G06F 3/06* (2006.01)
*G06F 12/12* (2016.01)

(52) U.S. Cl.
CPC ............. *G06F 12/121* (2013.01); *G06F 3/067* (2013.01); *G06F 3/0617* (2013.01); *G06F 3/0652* (2013.01)

(58) Field of Classification Search
CPC .... G06F 12/121; G06F 3/067; G06F 3/0652; G06F 3/0617
USPC ......................................................... 711/114
See application file for complete search history.

(56) References Cited

U.S. PATENT DOCUMENTS

| | | | |
|---|---|---|---|
| 2002/0010762 A1* | 1/2002 | Kodama | H04L 29/06 709/219 |
| 2003/0014523 A1* | 1/2003 | Teloh | G06F 11/2058 709/226 |
| 2010/0281080 A1* | 11/2010 | Rajaram | G06F 3/0608 707/813 |

OTHER PUBLICATIONS

Riri—"Performance—How to Compare two Elements in a List in a Constant Time" Feb. 17, 2011 (PDF attached).*
Riri, "Performance—How to compare two elements in a list in constant time" Feb. 17, 2011.*

(Continued)

*Primary Examiner* — David X Yi
*Assistant Examiner* — Zubair Ahmed
(74) *Attorney, Agent, or Firm* — Kwan & Olynick LLP

(57) ABSTRACT

Mechanisms are provided for efficient replica cleanup during resynchronization. According to various embodiments, a plurality of deleted data segment ranges on a first storage node may be identified. The first storage node may be configured to store a plurality of data segments. Each of the plurality of data segments may have associated therewith a respective identifier. Each of the data segment ranges may designate one or more data segments that have been deleted from the first storage node. The plurality of deleted data segment ranges may be transmitted to a second storage node configured to mirror the plurality of data segments stored on the first storage node. The plurality of deleted data segment ranges may be capable of being used to identify one or more data segments to delete from the second storage node.

13 Claims, 6 Drawing Sheets

(56) References Cited

OTHER PUBLICATIONS

Dubois, Laura et al., "Backup and Recovery: Accelerating Efficiency and Driving Down IT Costs Using Data Deduplication", White Paper, IDC, Retrieved from the Internet: <http://www.usicorp.com/Doc/USI%20White%20Papers/idc-20090519-data-deduplication.pdf (Feb. 1, 2010)>, Accessed on Dec. 29, 2013, Feb. 2010, 16 pgs.

Lillibridge, Mark et al., "Sparse Indexing: Large Scale, Inline Deduplication Using Sampling and Locality", HP Laboratories, Retrieved from the Internet: <http://www.hpl.hp.com/techreports/2009/HPL-2009-122.pdf>, Accessed on Dec. 29, 2013, Jun. 6, 2009, 14 pgs.

Yang, Tianming et al., "DEBAR: A Scalable High-Performance Deduplication Storage System for Backup and Archiving", CSE Technical Reports, University of Nebraska-Lincoln, Retrieved from the Internet: <http://digitalcommons.unl.edu/cgi/viewcontent.cgi?article=1059&context=csetechreports>, Accessed on Dec. 29, 2013, Jan. 5, 2009, 20 pgs.

* cited by examiner

EFFICIENT REPLICA CLEANUP DURING RESYNCHRONIZATION

CROSS-REFERENCE TO RELATED APPLICATION

This application claims benefit under 35 U.S.C. §119(e) to U.S. Provisional Application 61/751,245 (DELLP038P), titled "EFFICIENT REPLICA CLEANUP DURING RESYNCHRONIZATION," filed Jan. 10, 2013, the entirety of which is incorporated by reference for all purposes.

TECHNICAL FIELD

The present disclosure relates to the synchronization of data across different storage nodes.

DESCRIPTION OF RELATED ART

Data is often stored in storage systems that include more than one storage node on which data may be stored. In some systems, the data stored on a primary storage node may be mirrored on one or more secondary storage nodes. Data may be synchronized in this way for several purposes. For instance, storing data on more than one storage mode may provide redundancy in case of storage node failure and/or improved data access times in case one storage node receives more access requests than it can handle in a timely fashion.

In some instances, a secondary storage node may become disconnected from the primary storage node. For instance, network failure or congestion may obstruct traffic between the two nodes, or one of the nodes may suffer from a software or hardware malfunction. When such a disconnection occurs, the data stored on the secondary node may become out-of-sync with the primary node. For instance, data on the primary node may have been added, deleted, or modified during the period of disconnection, and these changes would not be reflected on the data stored on the secondary node.

In these and other situations, the data stored on the secondary node must be checked and modified as necessary to bring it in-sync with the data stored on the primary node. This process is often referred to as resynchronizing the secondary node with the primary node. One important component of resynchronization is identifying and deleting data on the secondary node that has been deleted on the primary node during the time period in which the two nodes are disconnected.

BRIEF DESCRIPTION OF THE DRAWINGS

The disclosure may best be understood by reference to the following description taken in conjunction with the accompanying drawings, which illustrate particular embodiments of the present invention.

DESCRIPTION OF PARTICULAR EMBODIMENTS

Figure 1:
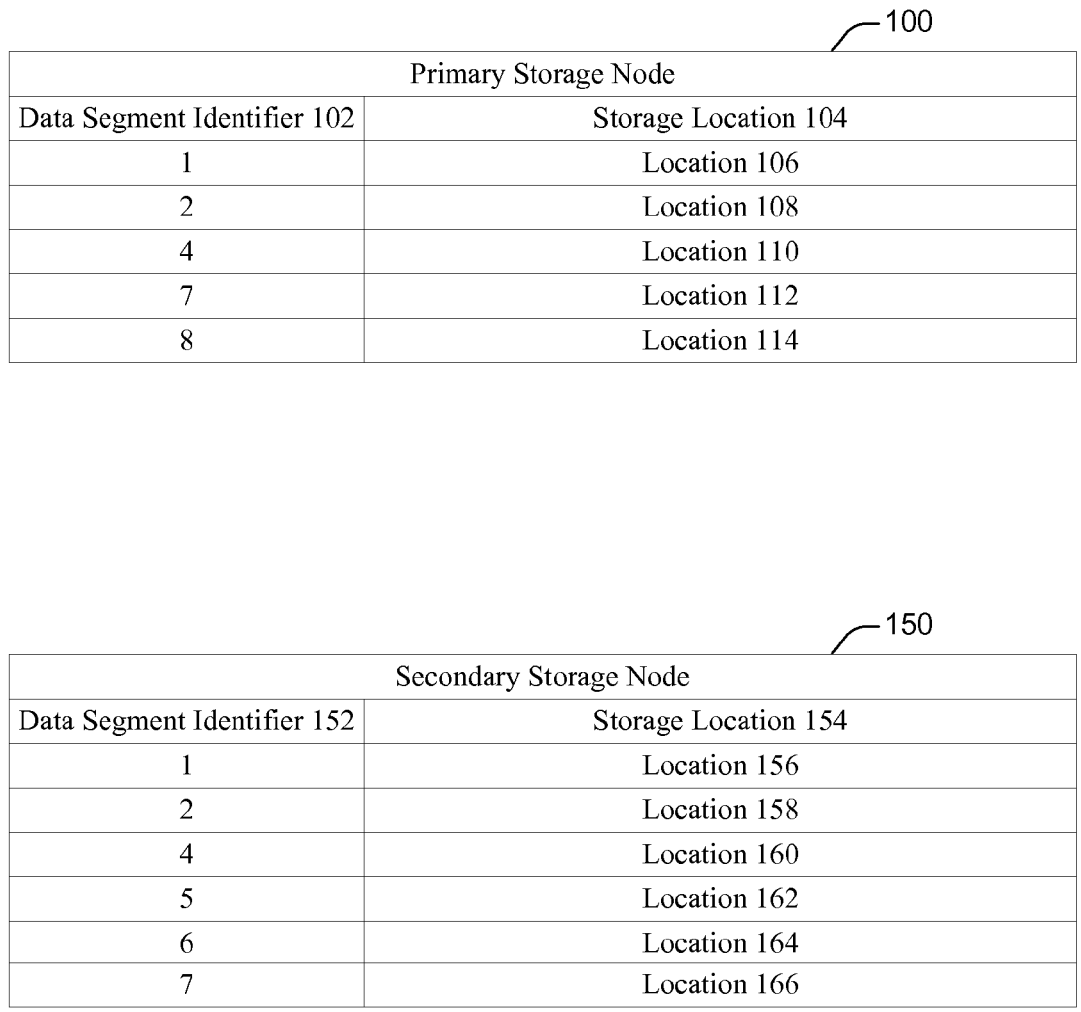
FIG. 1 illustrates a particular example of an arrangement of data segments in storage nodes.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques and mechanisms of the present invention will be described in the context of particular data storage mechanisms. However, it should be noted that the techniques and mechanisms of the present invention apply to a variety of different data storage mechanisms. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

Techniques and mechanisms are provided for synchronizing storage nodes in a storage system. Many storage systems replicate the contents of a primary storage node on one or more secondary storage nodes. Often this replication is performed in real time. However, in some situations a secondary storage node can become out-of-sync with the primary storage node. One important step in bringing the data on the two nodes back into sync is to clean up data that has been deleted from the primary node but that is still present on the secondary node. According to various embodiments, the data on the secondary node may be brought back into sync by creating a list of ranges of data segments on the primary node that have been deleted. The list may then be transmitted to the secondary node, which may flag any segment corresponding to a range of deleted data segments as a candidate for deletion.

Example Embodiments

In a live replication scenario, a secondary storage node mirrors the content stored on the primary storage node.

When the secondary node becomes out-of-sync with the primary storage node, the secondary storage node may need to be brought back in-sync with the primary storage node. This process is termed as resynchronization of the secondary storage node with the primary storage node. The nodes may become out of sync due to conditions such as network outage or unavailability of the secondary storage node.

When an out-of-sync situation occurs, one important step in bringing the data in-sync is to clean up the data deleted from the primary storage node that is still present on the secondary storage node. This step is also needed to clear up space on the secondary storage node in order to accommodate new data which has been created on the primary storage node during the time when replica is out-of-sync. In many conventional techniques, this deletion resynchronization process involves crawling and comparing the whole name space on both primary and secondary storage nodes. This approach is very CPU time, memory, and bandwidth intensive since it requires computing two lists (one for each storage node), comparing the two lists, and deleting the extra entities that are not present on primary storage node list. The requirement for bandwidth comes from the fact that we need to transfer one of the lists over the wire for comparison, and the list may be quite large since it includes each file or data segment stored on the storage node.

Indeed, if "n" represents the amount of data stored on the storage system, many conventional techniques require O(n log n) time complexity and O(n) space complexity. This is because conventional techniques often involve comparing all of the files in a directory between a primary storage node and a secondary storage node by reading and sorting them in memory. In addition, a large amount of network bandwidth is required to transfer the entire list.

According to various embodiments, techniques described herein may allow the resynchronization of deletions across the two storage systems in O(1) time complexity and O(1) space complexity. These techniques may alleviate the problems inherent in list comparison as well as reduce the CPU-time, memory, and bandwidth required for resynchronization.

According to various embodiments, a file system may assign a unique identifier to each file, data segment, or other data object capable of being stored in the file system. In particular embodiments, the unique identifier assigned on the primary storage node may be the same as the unique identifier assigned on the secondary storage node. Alternately, the unique identifiers on different storage systems may be different but may be mapable, for example through use of a lookup table. An example of a unique identifier used in many file systems is an inode number.

According to various embodiments, a system such as a storage controller may retrieve a list of files or data segments stored on a storage node. The list may be sorted by identifier (e.g., inode number). The list may be stored in, for instance, increasing order starting with the minimum inode number of a data segment present on the storage system.

According to various embodiments, the system may traverse the ordered list and search for situations where there is a gap between identifiers. For instance, if the system finds an inode number X, and the next inode in-order is X+4, we treat this situation as a "hole" or a range of deleted data segments. This hole indicates that the inodes numbered X+1, X+2, and X+3 have all been deleted. This hole may be represented as [X, X+2].

According to various embodiments, the system may identify potentially many such holes and then send the information for use in resynchronizing the secondary storage node, for instance as a list of deleted data segment ranges. Then, the list may be examined at the secondary storage node to identify data segments that should be deleted at the secondary storage node. Any data segment present at the secondary storage node that has an identifier that falls within a range of deleted data segments can then be marked for deletion at the secondary storage node.

For many conventional techniques for resynchronization, the entire name space of the file system must be crawled at once to compute a list of data segments stored on a storage node. Further, if the process is interrupted, then the process must be restarted from the beginning since nodes may have been added or deleted during the interruption period. Also, conventional techniques for resynchronization often require sending a large, complete list of stored files or data segments between the two storage nodes, which imposes a large bandwidth cost on resynchronization.

According to various embodiments, techniques described herein may be used to synchronize or resynchronize deletions across storage nodes without needing to crawl the entire file system name space at once to compute the list. In addition, if the resynchronization is interrupted, the procedure may be resumed from the point at which it was interrupted.

FIG. 1 illustrates a particular example of an arrangement of data segments in storage nodes. The arrangement of data segments shown in FIG. 1 includes an arrangement of data segments in a primary storage node 100 and an arrangement of data segments in a secondary storage node 150. Each list of data segments includes a data segment identifier column, column 102 for the primary storage node and column 152 for the secondary storage node. Each list of data segments also includes a storage location column, column 104 for the primary storage node and column 154 for the secondary storage node. The primary storage node includes data segments stored at locations 106-114, while the secondary storage node includes data segments stored at locations 156-166.

According to various embodiments, a storage node may include one or more storage devices configured to store data. For instance, a storage node may include one or more hard drives, tape drives, magnetic drives, non-volatile RAM-drives, memory modules, or other such components. In particular embodiments, a storage node may include other hardware and/or software components such as one or more storage controllers and/or network interfaces. A storage controller may facilitate reading and writing data stored on a storage device included in the storage node.

According to various embodiments, each data segment may be any object capable of being stored in a file system. For example, a data segment may be a file or a directory. As another example, a data segment may be a portion of a file or a directory that is separated into different data segments.

In particular embodiments, the storage location column may identify information about the data segment instead of, or in addition to, an actual storage location on a disk. For instance, the storage location column may identify a file name associated with the data segment.

According to various embodiments, the data segment identifier may be an inode. An inode may be used to store information about a file system object, such as file, device node, socket, pipe, etc. This metadata may be used to help track data that is stored on a storage node.

According to various embodiments, each data segment may represent any type of data. For instance, a data segment may represent an entire file or only a piece of a file. It should be noted that the example shown in FIG. 1 is a simplified for the purpose of clarity. Storage systems typically include many different data segments, and data segment identifiers are often encoded as large binary or hexadecimal numbers, such as 32-bit or 64-bit numbers. However, the simple examples shown in FIG. 1 help to illustrate various techniques and mechanisms described herein.

According to various embodiments, the lists shown in FIG. 1 represent the identifiers and locations of various data segments stored in each of the storage nodes. For instance, the data segment corresponding to the identifier 2 is stored at location 108 in the primary storage node 100 and at location 158 in the secondary storage node 150.

According to various embodiments, the lists shown in FIG. 1 may be maintained when adding, deleting, and/or modifying data segments on each storage node. For instance, when a data segment is added to the primary storage node, it may be assigned a new data segment identifier. Then, a new entry may be added to the primary storage node list that includes the new data segment identifier and a location on the primary storage node at which the new data segment is stored. If a data segment is deleted from the primary storage node, then the row corresponding to that data segment may be deleted from the list.

Thus, according to various embodiments, the list of data segments may be incomplete in the sense that when a data segment is deleted from the primary node, the data segment and its identifier and location information are removed from the list of data segments. For instance, data segments 3, 5, and 6 are missing from the primary storage node list 100, which indicates that those data segments have been deleted. In particular embodiments, a deleted data segment may remain on the list but may be assigned a flag or other indicator indicating that the data segment has been deleted. For instance, recently deleted data segments may be maintained in this way to facilitate retrieval if the deletion was inadvertent.

According to various embodiments, each data segment stored in the primary node may be assigned a unique identifier. In many storage systems, identifiers are assigned incrementally and are not recycled. For instance, each data segment may be assigned a 64-bit identifier that is not used for any other data segment. When the data segment is deleted, the 64-bit identifier is then retired from use. In other storage systems, identifiers may eventually be reassigned. However, reassigned identifiers may still be made effectively unique in other ways, such as assigning each identifier with a version number which, when provides uniqueness when it is combined with the identifier. In the example shown in FIG. 1, the data segments corresponding to the identifiers 1 through 8 have been assigned.

According to various embodiments, a storage system that includes the primary and secondary storage nodes may be configured to synchronize the secondary storage node based on changes to the primary storage node. For instance, if a data segment is added to or modified on the primary storage node, it should be added to or modified on almost immediately on the secondary storage node. Likewise if a data segment is deleted from the primary storage node, it should be deleted almost immediately from the secondary storage node.

According to various embodiments, when the two storage nodes are synchronized, each storage node stores the same data segments. In particular embodiments, each data segment may be assigned the same data segment identifier on each storage node. Alternately, the data segment identifiers across storage nodes may differ but may correspond with each other in some way, such as via a directory look up or matching function. However, it should be noted that although the storage system is configured to synchronize the two storage nodes, the data segments stored on the two storage nodes need not be stored at the same location on the two storage nodes. For instance, the storage nodes may differ in terms of hardware, which may lead the same data to be stored at different locations.

In the example shown in FIG. 1, the two storage nodes are out-of-sync. For instance, the primary storage node includes the data segment 8, which is not stored on the secondary storage node. Likewise, the secondary storage node includes the data segments 5 and 6, which are not included on the primary storage node. Such a situation may arise if, for example, a network failure has prevented communication between the primary and secondary storage node. So, in this example the data segment 8 was added to the primary storage node and the data segments 5 and 6 were deleted from the primary storage mode during a time period in which the two nodes were not communicating. Since the two nodes were not communicating, these changes were not reflected on the secondary storage mode.

According to various embodiments, in order to resynchronize the two storage nodes, any modifications, additions, or deletions performed on the primary storage node 100 may need to be duplicated on the secondary storage node 150. In order to duplicate any deletions, a list of deleted data segment ranges for the primary storage node may be determined. For instance, in FIG. 1, the list of deleted data segment ranges would include the range [2,4] since all of the data segments between 2 and 4 (i.e. data segment 3) have been deleted from the primary storage node. The list of deleted data segment ranges would also include the range [4,7] since all of the data segments between 4 and 7 (i.e. data segments 5 and 6) have been deleted from the primary storage node.

According to various embodiments, the list may then be used to perform any necessary deletions on the secondary storage node. For instance, the system may first analyze the range [2,4]. However, since the data segment 3 has already been deleted from the secondary storage node, no additional deletion is necessary. Then, the system may analyze the range [4,7]. The secondary storage node includes two data segments within this range, the data segments 5 and 6. Accordingly, both data segment 5 and data segment 6 may be selected as candidates for deletion on the secondary storage node. In particular embodiments, the data segments may be deleted on the secondary storage node by removing them from the list 150.

According to various embodiments, a storage system may potentially have many primary nodes, and each primary node may be potentially mirrored on many secondary nodes. However, for the purpose of clarity, some examples described herein focus on a single primary node and its synchronization with a single secondary node that mirrors the data stored on the primary node.

Figure 2:
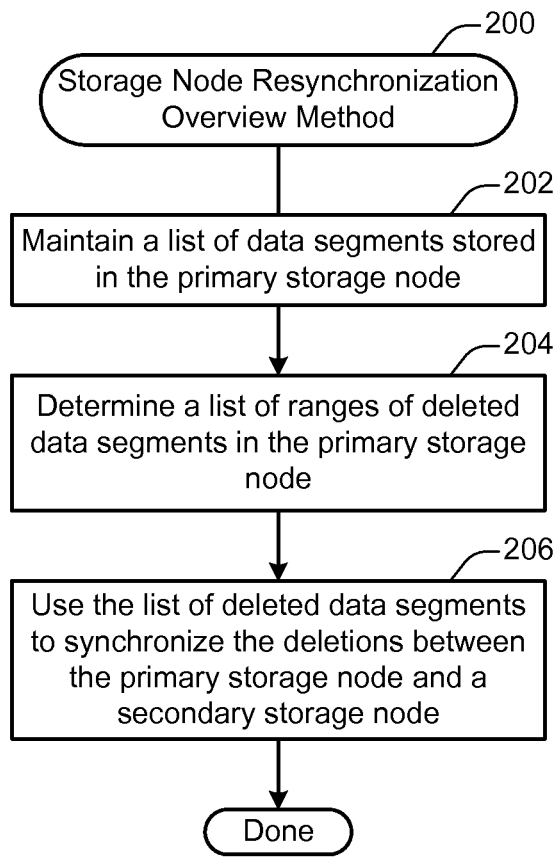
FIG. 2 illustrates a particular example of an overview method for resynchronizing a secondary network node with deletions on a primary network node.

FIG. 2 illustrates a particular example of an overview method 200 for resynchronizing a secondary storage node with deletions on a primary storage node. According to various embodiments, the method 200 may be performed at a storage system, which may include one or more primary and secondary network nodes. The storage system may be configured to synchronize the nodes such that the data stored on each secondary node mirrors the data stored on the primary node.

At 202, a list of data segments stored in the primary node is maintained. According to various embodiments, as discussed with respect to FIG. 1, each data segment stored on a storage node may be assigned an identifier. Further, a data segment that is mirrored on a secondary node may be assigned an identifier on the secondary node that matches or corresponds with the identifier on the primary node.

According to various embodiments, the list of data segments may be used to identify which data segments have been deleted from the primary node. For instance, a data segment that has been deleted from the primary node may be removed from the list entirely or assigned a flag indicating that the data segment has been deleted. The list may be updated when a data segment is added, deleted, and/or modified. In particular embodiments, the list may be ordered by identifier to facilitate the determination of ranges of deleted data segments.

At 204, a list of ranges of deleted data segments is determined According to various embodiments, a range of deleted data segments may indicate an initial identifier and a terminal identifier that is larger than the initial identifier. Data segments between the initial and terminal identifiers are those that have been deleted from the primary storage node. For instance, a range of "[5, 8]" may indicate that the data segments corresponding to the identifiers 6 and 7 have been deleted.

According to various embodiments, the ranges of deleted data segments may be determined by analyzing the list of data segments. For instance, an ordered list of data segments may be traversed to identify ranges of deleted data segments. Each range of deleted data segments may then be added to the list for use in synchronizing the secondary node with the deletions of data segments on the primary node. Examples of techniques for identifying deleted data segments are discussed with respect to FIG. 3.

At 206, the list of ranges of deleted data segments is used to synchronize the deletions between the primary and secondary nodes. The list of ranges of deleted data segments may be transmitted to the secondary node or analyzed at a storage system controller. Then, the list of ranges of data segments deleted on the primary node may be compared with the list of ranges of data segments stored on the secondary node. When a data segment that is stored on the secondary node has been deleted on the primary node, the data segment may be marked for deletion on the primary node. Examples of techniques for synchronizing the deletions between the primary and secondary nodes are discussed with respect to FIG. 4.

According to various embodiments, the operations shown in FIG. 2 may be performed continuously, periodically, when scheduled, when triggered, or according to any other time frame. For example, one or more of the operations may be performed periodically or continuously as part of the normal operation of the storage system. As another example, one or more of the operations may be performed when triggered, such as when a secondary node is disconnected from a primary node or reconnected to a primary node after a disconnection. As yet another example, one or more of the operations may be performed as part of maintenance process. For instance, even when no disconnection has been detected, deletions of data stored on a secondary node may be compared with deletions of data stored on a primary node to ensure that the data is synchronized and that synchronization errors have not occurred.

Figure 3:
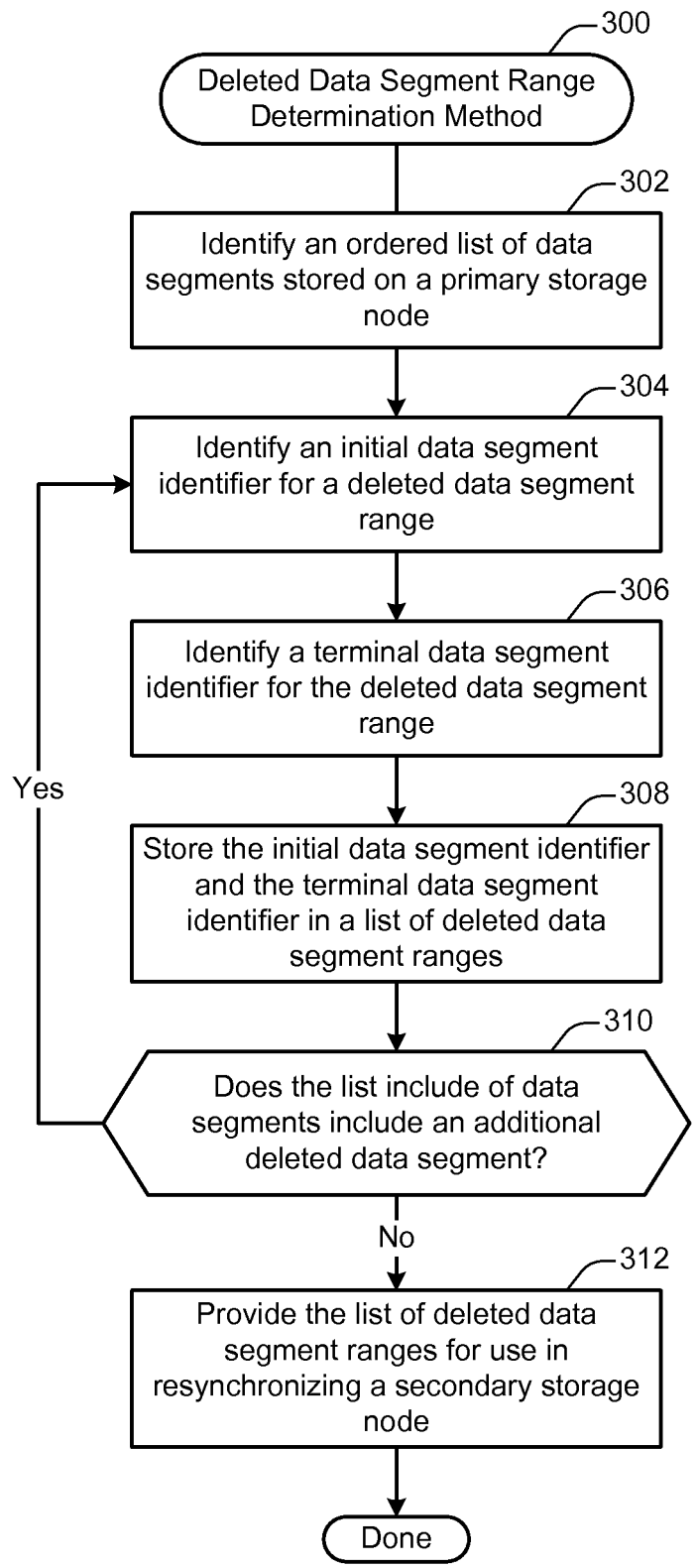
FIG. 3 illustrates a particular example of a method for identifying deleted data segment ranges.

FIG. 3 illustrates a particular example of a method 300 for identifying deleted data segment ranges. According to various embodiments, the method 300 may be performed at a storage system having a primary storage node that is synchronized with one or more secondary storage nodes. As discussed with respect to FIG. 2, operations shown in FIG. 3 may be performed as part of the normal operation of the storage system, upon request, at scheduled times, or according to any other time frame. For instance, the method 300 may be performed as part of a process to resynchronize a secondary storage node with a primary storage node.

At 302, an ordered list of data segments stored on a primary storage node is identified. According to various embodiments, the ordered list may order the data segments stored on the primary storage node by identifier. Examples of ordered lists of data segments are shown in FIG. 1.

According to various embodiments, the ordered list may be provided by a file system. The file system may maintain an ordered list as part of the normal operation of the file system or may be able to quickly provide the ordered list upon request.

At 304, an initial data segment identifier for a deleted data segment range is identified. According to various embodiments, the initial data segment identifier may be identified by traversing the ordered list of data segments stored on the primary storage node. A data segment that has an identifier for which the next consecutive identifier has been deleted may be identified as an initial data segment identifier. For instance, in FIG. 1, the data segment identifiers 2 and 4 would both be identified as initial data segment identifiers. The data segment identifier 2 is consecutively followed by the data segment identifier 3, which has been deleted because it does not appear on the list. Similarly, the data segment identifier 4 is consecutively followed by the data segment identifier 7, which has also been deleted.

At 306, the terminal data segment identifier for the deleted data segment range is identified. According to various embodiments, the terminal data segment identifier may indicate the next data segment, in order, that has not yet been deleted. For instance, if the initial data segment identifier is the identifier for data segment 4 shown in FIG. 1, then the terminal data segment identifier would be the identifier for data segment 7.

According to various embodiments, the terminal data segment identifier may be identified by traversing the ordered list in order. After an initial data segment identifier is identified, the terminal data segment identifier is the next identifier that corresponds to a segment that has not been deleted. For instance, after the data segment identifier 4 is read from the list 100 shown in FIG. 1, the next identifier read is the data segment identifier 7. Accordingly, the terminal data segment identifier is 7.

At 308, the initial data segment identifier and the terminal data segment identifier are stored in a list of deleted data segment ranges. For instance, in the example shown in FIG. 1, the range "[2,4]" may be stored to indicate that the data segment corresponding to the identifier 3 is missing. The stored list of deleted data segment ranges may then be provided to the secondary storage node, as discussed with respect to operation 312.

According to various embodiments, the way in which a range of deleted data segments is identified is in some sense an arbitrary decision. For instance, the initial and terminal data segment identifiers may be inclusive or exclusive. In most of the examples discussed herein, an exclusive approach is used. So, the range "[2,4]" indicates that the data segment 3 has been deleted, but that the data segments 2 and 4 have not been deleted. However, in an inclusive approach, the range "[2,4]" would instead indicate that all of the data segments corresponding to the identifiers 2, 3, and 4 have been deleted. Different storage systems or file systems may use different approaches, but the effect is substantially the same.

At 310, a determination is made as to whether the list of data segments includes an additional deleted data segment that is not yet included in any of the ranges of deleted data segments stored at operation 308. According to various embodiments, the ordered list of data segments may be analyzed sequentially or in any other ordering. Accordingly, the determination may be made simply by traversing the ordered list from beginning to end. Then, whenever a deleted data segment is detected, the operations 304-310 may be performed.

At 312, the list of deleted data segment ranges is provided for use in resynchronizing a secondary storage node. According to various embodiments, providing the list may involve any operations for making the list available for use in analyzing the data segments stored on the secondary storage. For example, the list may be transmitted to the secondary storage node via a network. As another example, the list may be provided to a storage controller or other system component. As yet another example, the list may be stored on a storage device for later retrieval.

Figure 4:
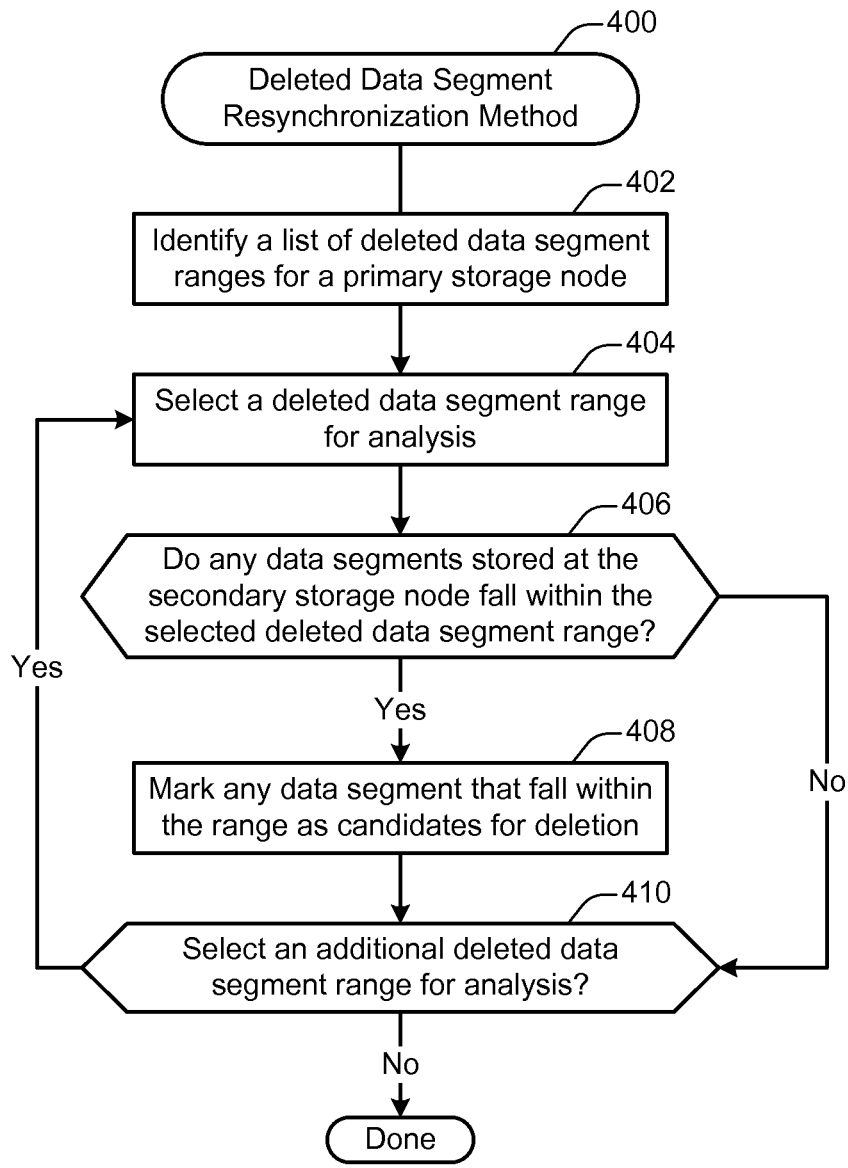
FIG. 4 illustrates a particular example of a method for performing deleted data segment resynchronization.

FIG. 4 illustrates a particular example of a method 400 for performing deleted data segment resynchronization. According to various embodiments, the method 400 may be performed at a storage system with a secondary storage node. In particular embodiments, the secondary storage node may have become out-of-sync with the primary storage node. Alternately, the secondary storage node may not be actually out-of-sync with the primary storage node, and the techniques may be performed in order to verify that the two nodes are in-sync.

At 402, a list of deleted data segment ranges for a primary storage node is identified. According to various embodiments, each deleted data segment range in the list may indicate one or more data segments that have been deleted from the primary storage node. In particular embodiments, the list of deleted data segment ranges may be generated as discussed with respect to FIG. 3.

According to various embodiments, the list of deleted data segments may be prepared at a storage controller configured to control both the primary and secondary storage nodes. Alternately, the list may be prepared at the primary storage node and then transmitted to the secondary storage node, for instance via a network.

At 404, a deleted data segment range is selected for analysis. In particular embodiments, the deleted data segment ranges may be ordered and analyzed in order. For instance, a deleted data segment range with smaller initial and terminal data segment identifiers may be analyzed before a deleted data segment range with larger initial and terminal data segment identifiers. Alternately, some other ordering of the deleted data segment ranges may be used.

At 406, a determination is made as to whether any data segments at the secondary storage node fall within the deleted data segment range. According to various embodiments, the determination may be made by comparing the deleted data segment range with a list of data segments stored at the secondary storage node. For example, in the example shown in FIG. 1, the system may analyze the range [2,4]. However, since the data segment 3 has already been deleted from the secondary storage node, no additional deletion is necessary. As another example, the system may analyze the range [4,7]. The secondary storage node includes two data segments within this range, the data segments 5 and 6.

At 408, the segment or segments that fall within the selected range are marked for deletion. According to various embodiments, marking a segment for deletion may be performed using any of various techniques that may depend on the particularities of the storage system on which the techniques are implemented. For example, a data segment may be deleted simply by removing it from a list of data segments stored on the secondary node, as described with respect to FIG. 1. Since the storage space for the data segment is no longer marked as used, the storage node may use the storage space to store other data segments.

As another example, a data segment may be marked for deletion by applying a flag or other indicator to a list similar to that shown in FIG. 1. Then, the data segment may be actually deleted from the node at a later time. A data segment may be marked as a candidate for deletion but not deleted immediately for various reasons. For instance, the data segment may be marked for recovery in the event that the deletion on the primary storage node was inadvertent.

At 410, a determination is made as to whether to select an additional deleted data segment range for analysis. According to various embodiments, the determination may be made at least in part based on the list of deleted data segment ranges identified at operation 402. For instance, each deleted data segment range included on the list may be analyzed in succession to ensure that each data segment deleted on the primary node is also deleted on the secondary node.

Figure 5:
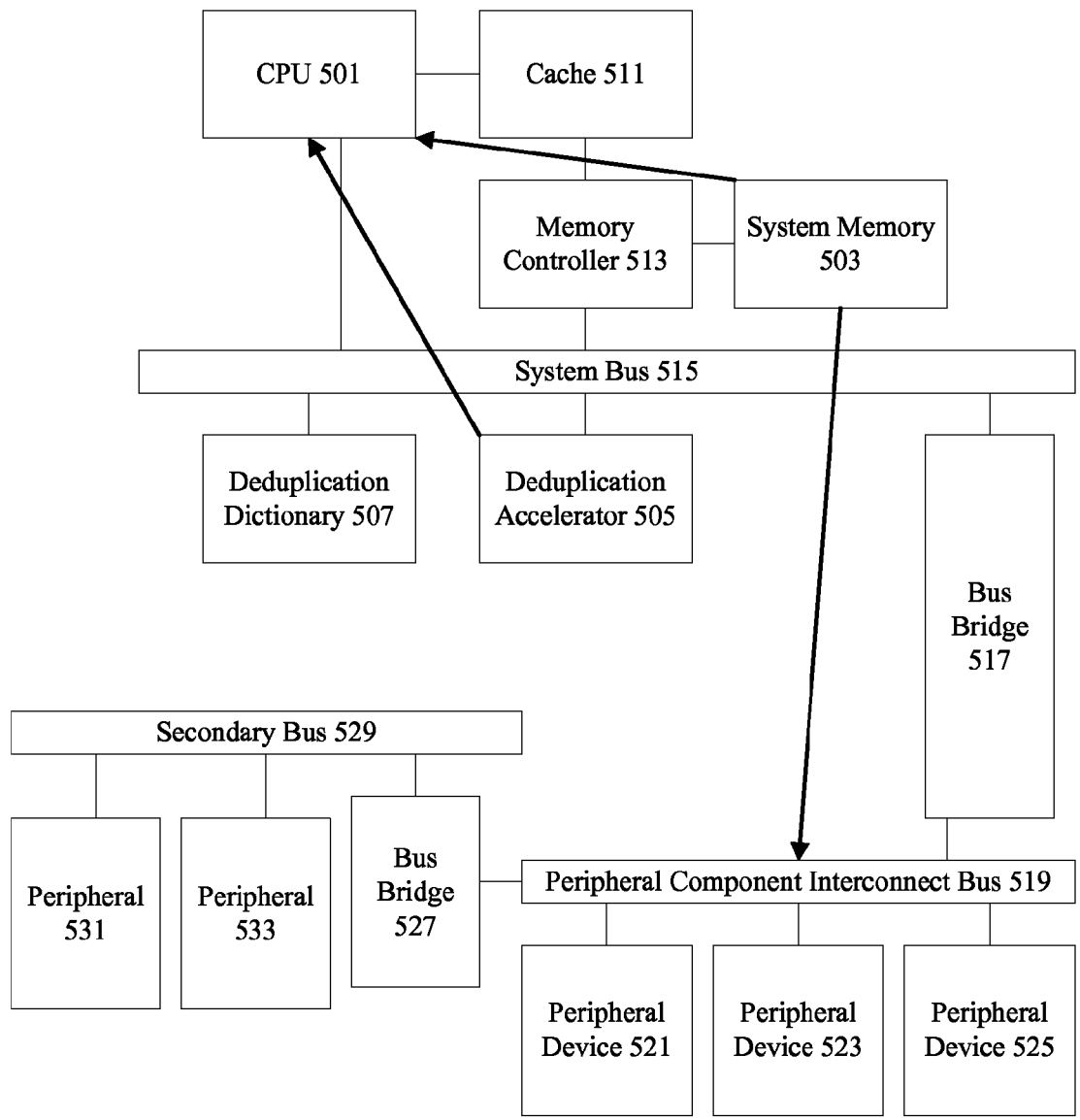
FIG. 5 illustrates a particular example of a system that can use the techniques and mechanisms of the present invention.

FIG. 5 illustrates a particular example of a system that can use the techniques and mechanisms of the present invention. According to various embodiments, data is received at an accelerated deduplication system 500 over an interface such as a network interface. A data stream may be received in segments or blocks and maintained in system memory 503. According to various embodiments, a processor or CPU 501 maintains a state machine but offloads boundary detection and fingerprinting to a deduplication engine or deduplication accelerator 505. The CPU 501 is associated with cache 511 and memory controller 513. According to various embodiments, cache 511 and memory controller 513 may be integrated onto the CPU 501.

In particular embodiments, the deduplication engine or deduplication accelerator 505 is connected to the CPU 501 over a system bus 515 and detects boundaries using an algorithm such as Rabin to delineate segments of data in system memory 503 and generates fingerprints using algorithms such as hashing algorithms like SHA-1 or MD-5. The deduplication engine 505 accesses the deduplication dictionary 507 to determine if a fingerprint is already included in the deduplication dictionary 507. According to various embodiments, the deduplication dictionary 507 is maintained in persistent storage and maps segment fingerprints to segment storage locations. In particular embodiments, segment storage locations are maintained in fixed size extents. Datastore suitcases, references, metadata, etc., may be created or modified based on the result of the dictionary lookup.

If the data needs to be transferred to persistent storage, the optimization software stack will communicate to the CPU 501 the final destination direct memory access (DMA) addresses for the data. The DMA addresses can then be used to transfer the data through one or more bus bridges 517 and/or 527 and secondary buses 519 and/or 529. In example of a secondary bus is a peripheral component interconnect (PCI) bus 519. Peripherals 521, 523, 525, 531, and 533 may be peripheral components and/or peripheral interfaces such as disk arrays, network interfaces, serial interfaces, timers, tape devices, etc.

Figure 6:
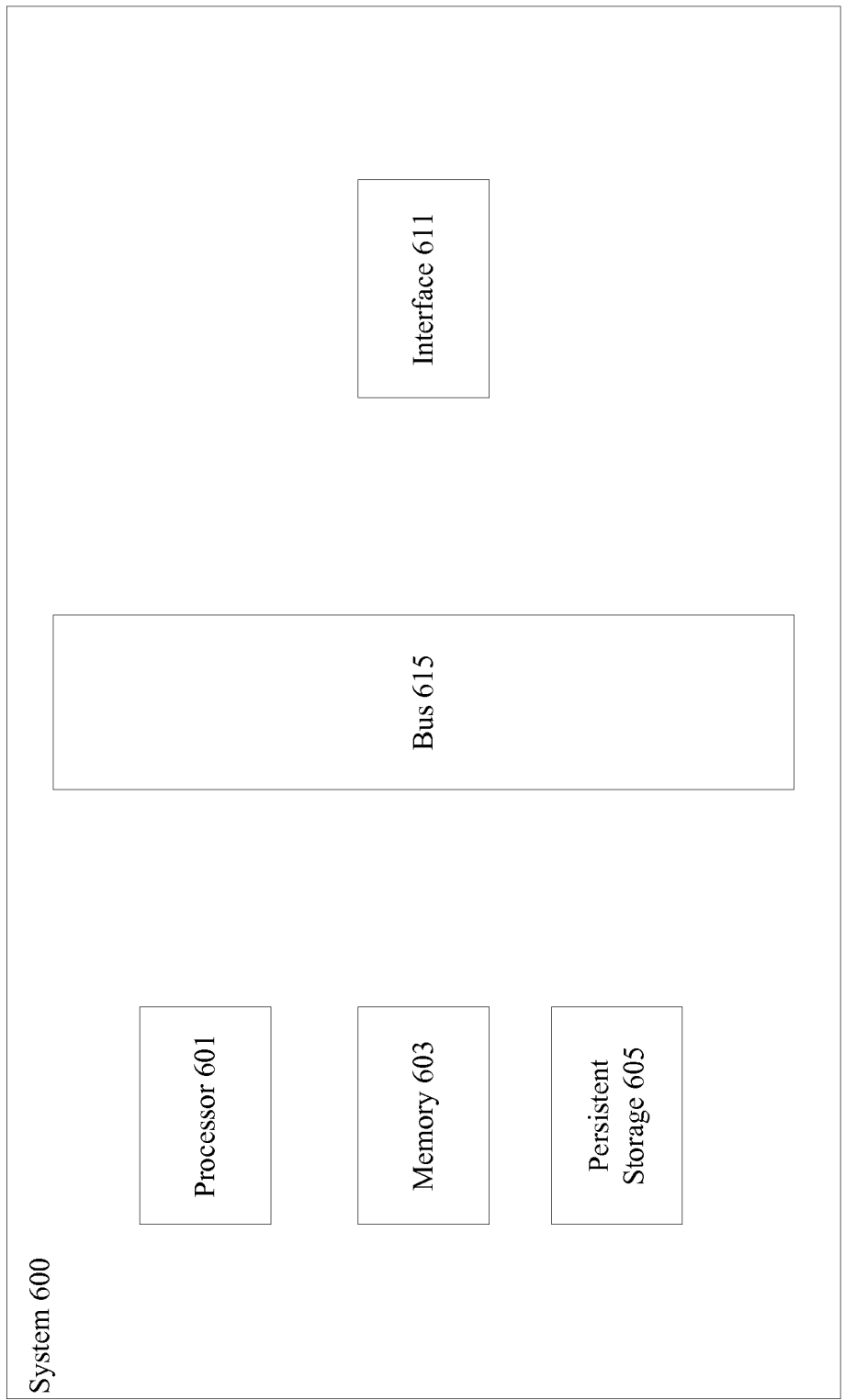
FIG. 6 illustrates a particular example of a storage system.

A variety of devices and applications can implement particular examples of the present invention. FIG. 6 illustrates one example of a system that can be used as a storage node in a deduplication system. According to particular example embodiments, a system 600 suitable for implementing particular embodiments of the present invention includes a processor 601, a memory 603, an interface 611, persistent storage 605, and a bus 615 (e.g., a PCI bus). When acting under the control of appropriate software or firmware, the processor 601 is responsible for such tasks such as optimization. Various specially configured devices can also be used in place of a processor 601 or in addition to processor 601. The complete implementation can also be done in custom hardware. The interface 611 is typically configured to send and receive data packets or data segments over a network. Particular examples of interfaces the device supports include Ethernet interfaces, frame relay interfaces, cable interfaces, DSL interfaces, token ring interfaces, and the like. Persistent storage 605 may include disks, disk arrays, tape devices, solid state storage, etc.

In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 600 uses memory 603 to store data and program instructions and maintain a local side cache. The program instructions may control the operation of an operating system and/or one or more applications, for example. The memory or memories may also be configured to store received metadata and batch requested metadata.

Because such information and program instructions may be employed to implement the systems/methods described herein, the present invention relates to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Although many of the components and processes are described above in the singular for convenience, it will be appreciated by one of skill in the art that multiple components and repeated processes can also be used to practice the techniques of the present invention.

While the invention has been particularly shown and described with reference to specific embodiments thereof, it will be understood by those skilled in the art that changes in the form and details of the disclosed embodiments may be made without departing from the spirit or scope of the invention. It is therefore intended that the invention be interpreted to include all variations and equivalents that fall within the true spirit and scope of the present invention.

What is claimed is:

1. A method for resynchronization comprising:
transmitting from a first storage node to a second storage node a plurality of data segment deletion messages, the first storage node storing a plurality of data segments, each of the plurality of data segments having associated therewith a respective identifier, the second storage node configured to mirror the plurality of data segments stored on the first storage node, the data deletion messages each indicating a respective one or more data segments that have been deleted on the first storage node, wherein a designated identifier associated with a first deleted data segment is not reused to identify a second data segment;
detecting reestablishment of communication between the first storage node and the second node after communication between the first storage node and the second storage node has been interrupted;
identifying a plurality of deleted data segment ranges on a first storage node, each of the data segment ranges including a respective initial data segment identifier and a respective terminal data segment identifier to indicate a respective sequence of one or more data segments, the plurality of respective sequences of data segments together including the respective one or more data segments indicated in the data deletion messages; and
transmitting the plurality of deleted data segment ranges to the second storage node via a network to identify one or more data segments to delete from the second storage node,
wherein the resynchronization is capable of being performed in O(1) CPU-time relative to the amount of data stored on the first storage node,
wherein the plurality of deleted data segment ranges are in sorted form in a list enabling resynchronization to be performed in real time.

2. The method recited in claim 1, the method further comprising:
deleting, at the second storage node, the one or more data segments identified for deletion from the second storage node.

3. The method recited in claim 1, wherein each identifier comprises an inode number in a file system.

4. The method recited in claim 1, the method further comprising:
detecting a reestablishment of communication between the first and second storage nodes, wherein the plurality of deleted data segment ranges are transmitted when the reestablishment of communication is detected.

5. The method recited in claim 1, wherein the plurality of deleted data segment ranges are capable of being used to resynchronize deletions on the first storage node with deletions on the second storage node.

6. The method recited in claim 1, wherein each of the first and second storage nodes comprises a hard drive.

7. The method recited in claim 1, wherein deleted data segments on the first and second storage nodes are resynchronized without crawling the name space of the file system.

8. A system for performing resynchronization comprising:
a communications interface configured to:
transmit from a first storage node to a second storage node a plurality of data segment deletion messages, the first storage node storing a plurality of data segments, each of the plurality of data segments having associated therewith a respective identifier, the second storage node configured to mirror the plurality of data segments stored on the first storage node, the data deletion messages each indicating a respective one or more data segments that have been deleted on the first storage node, wherein a designated identifier associated with a first deleted data segment is not reused to identify a second data segment, and detect reestablishment of communication between the first storage node and the second node after communication between the first storage node and the second storage node has been interrupted;

a processor configured to:

identify a plurality of deleted data segment ranges on a first storage node, each of the data segment ranges including a respective initial data segment identifier and a respective terminal data segment identifier to indicate a respective sequence of one or more data segments, the plurality of respective sequences of data segments together including the respective one or more data segments indicated in the data deletion messages, and cause the communications interface configured to transmit the plurality of deleted data segment ranges to the second storage node via a network to identify one or more data segments to delete from the second storage node, wherein the resynchronization is capable of being performed in O(1) CPU-time relative to the amount of data stored on the first storage node, wherein the plurality of deleted data segment ranges are in sorted form in a list enabling resynchronization to be performed in real time.

9. The system recited in claim 8, wherein the processor is further operable to:

detect a reestablishment of communication between the first and second storage nodes, wherein the plurality of deleted data segment ranges are transmitted when the reestablishment of communication is detected.

10. The system recited in claim 8, wherein the plurality of deleted data segment ranges are capable of being used to resynchronize deletions on the first storage node with deletions on the second storage node.

11. One or more non-transitory computer readable media having instructions stored thereon for performing a method for resynchronization, the method comprising:

transmitting from a first storage node to a second storage node a plurality of data segment deletion messages, the first storage node storing a plurality of data segments, each of the plurality of data segments having associated therewith a respective identifier, the second storage node configured to mirror the plurality of data segments stored on the first storage node, the data deletion messages each indicating a respective one or more data segments that have been deleted on the first storage node, wherein a designated identifier associated with a first deleted data segment is not reused to identify a second data segment;

detecting reestablishment of communication between the first storage node and the second node after communication between the first storage node and the second storage node has been interrupted;

identifying a plurality of deleted data segment ranges on a first storage node, each of the data segment ranges including a respective initial data segment identifier and a respective terminal data segment identifier to indicate a respective sequence of one or more data segments, the plurality of respective sequences of data segments together including the respective one or more data segments indicated in the data deletion messages; and transmitting the plurality of deleted data segment ranges to the second storage node via a network to identify one or more data segments to delete from the second storage node, wherein the resynchronization is capable of being performed in O(1) CPU-time relative to the amount of data stored on the first storage node, wherein the plurality of deleted data segment ranges are in sorted form in a list enabling resynchronization to be performed in real time.

12. The one or more non-transitory computer readable media recited in claim 11, the method further comprising:

deleting, at the second storage node, the one or more data segments identified for deletion from the second storage node.

13. The one or more non-transitory computer readable media recited in claim 11, wherein each identifier comprises an inode number in a file system.

\* \* \* \* \*